United States Patent [19]

Lipton

[11] Patent Number: 5,757,383
[45] Date of Patent: May 26, 1998

[54] METHOD AND SYSTEM FOR HIGHLIGHTING TYPOGRAPHY ALONG A GEOMETRIC PATH

[75] Inventor: Daniel I. Lipton, San Francisco, Calif.

[73] Assignee: Apple Computer, Inc., Cupertino, Calif.

[21] Appl. No.: 644,242

[22] Filed: May 10, 1996

[51] Int. Cl.⁶ .................................................. G06F 15/00
[52] U.S. Cl. ...................................................... 345/442
[58] Field of Search ................................ 345/441, 442, 345/470, 118, 141

[56] References Cited

U.S. PATENT DOCUMENTS 4,984,183  1/1991  Ohuchi ................................ 395/134
5,633,997  5/1997  Barber et al. ....................... 395/140

*Primary Examiner*—Phu K. Nguyen
*Attorney, Agent, or Firm*—Sawyer & Associates

[57] ABSTRACT

A method and system for highlighting typography along a geometric path by a graphics system that includes a dashing feature is disclosed. The dashing feature is first used to determine the shape of the geometric path along a segment on which the typography is positioned. The dashing feature is then used to dash the segment with a non-repeating pattern. After dashing, the segment is outset from the geometric path to create an upper path, and inset from the geometric path to create a lower path. The method and system further includes connecting the upper and lower paths to create a new shape, and then filling-in the new shape to provide a field of continuous highlighting.

25 Claims, 6 Drawing Sheets

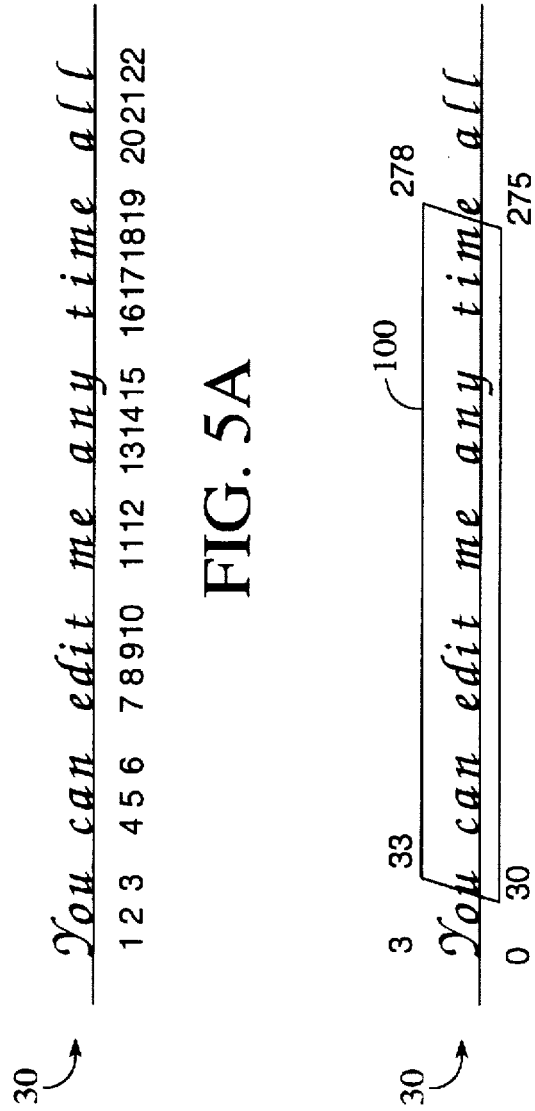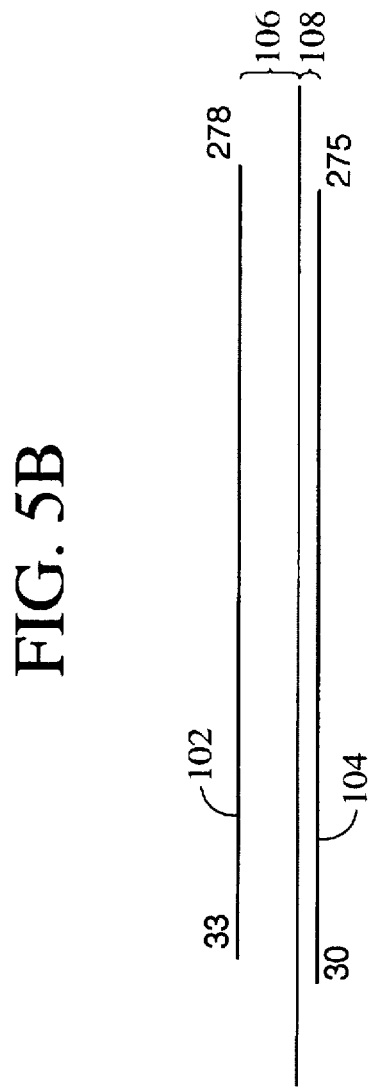
FIG. 5A
FIG. 5B
FIG. 5C

METHOD AND SYSTEM FOR HIGHLIGHTING TYPOGRAPHY ALONG A GEOMETRIC PATH

FIELD OF THE INVENTION

The present invention generally relates to highlighting and editing typography on a computer system, and more particularly relates to highlighting typography along a geometric path.

BACKGROUND OF THE INVENTION

Current computer systems provide individuals with opportunities to produce documents of professional quality, such as with desktop publishing software and graphics software programs. The ability to manipulate the appearance of the text within these programs is vital in allowing users greater flexibility and creativity in document production. Included in these manipulations are changes in fonts, justification, size, and other aspects of the appearance, such as bolding and italicizing.

Some graphic systems today are capable of performing extremely high-end typography, the ability to form fancy text on the screen as the user types normally. Examples of such systems include the Apple QuickDraw GX Graphics System, Adobe Illustrator, and Macromedia Freehand. Although most graphics programs can perform manipulations with some level of success, each program has a limitation in its range of manipulations due to design considerations.

For example, when a user is editing typography on a display screen, a traditional graphics system can properly indicate when the user has selected typography that has been typed along a straight line, but has difficulty indicating when the user has selected typography that has been typed along a geometric path. To indicate that a user has selected typography along a straight line, the graphics system blocks or surrounds the typography in a field of continuous highlighting. For typography formed along a geometric path, however, the graphics systems blocks the typography in a field of non-continuous highlighting that is broken on each character or symbol. While non-continuous highlighting does not present functional problems with actually editing the typography, it makes the text less legible and aesthetically unappealing to users.

What is needed therefore is a method and system for highlighting typography along a geometric path that generates a continuous highlight shape. The present invention addresses such a need.

SUMMARY OF THE INVENTION

The present invention is a method and system for highlighting typography along a geometric path by a graphics system that includes a dashing feature. The dashing feature is first used to determine the shape of the geometric path along a segment on which the typography is positioned. After determining the shape of the geometric path under the typography, a field is created around the shape, and the field is then filled-in to provide a continuous field of highlighting.

According to the method and system disclosed herein, the present invention increases the legibility of the selected typography, and reduces the time and cost of associated with developing additional typography software.

BRIEF DESCRIPTION OF THE DRAWINGS

FIGS. 5a, 5b and 5c are diagrams graphically depicting the input to a highlight function and the output returned.

DETAILED DESCRIPTION OF THE INVENTION

The present invention relates to an improvement in highlighting and editing typography. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
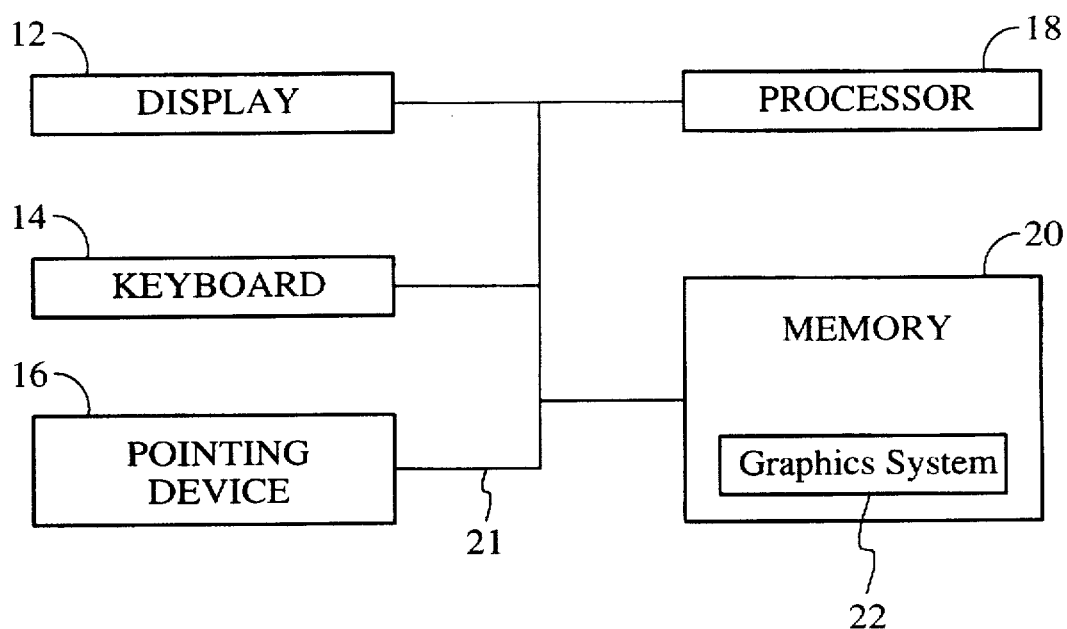
FIG. 1 is a block diagram illustrating a conventional computer system for running graphics systems in accordance with the present invention.

FIG. 1 is a block diagram illustrating a conventional computer system 10, which includes a display 12, a keyboard 14, a pointing device 16, a processor 18, and a memory 20, which are all connected by a bus 21. Although the computer system 10 is shown having a desk-top/notebook configuration, the computer system 10 may encompass other configurations, such has a hand-held or pen-based computer for instance. The processor 18 operates in conjunction with the memory 20 to execute a graphics system 22 that enables a user to create and manipulate graphics and text. In a preferred embodiment, the graphics system 22 may be similar to QuickDraw GX from Apple Computer, Cupertino, Calif.

Graphics systems typically enable the user to select a portion of typography to be copied, deleted, or moved, by moving a cursor across the typography on the display 12 using the pointing device 16. As stated above, if the user has selected typography positioned along a straight line, then the selection is indicated by a field of continuous highlighting. If the typography is positioned along a geometric path, however, the selection is indicated in a field of non-continuous highlighting.

Figure 2:
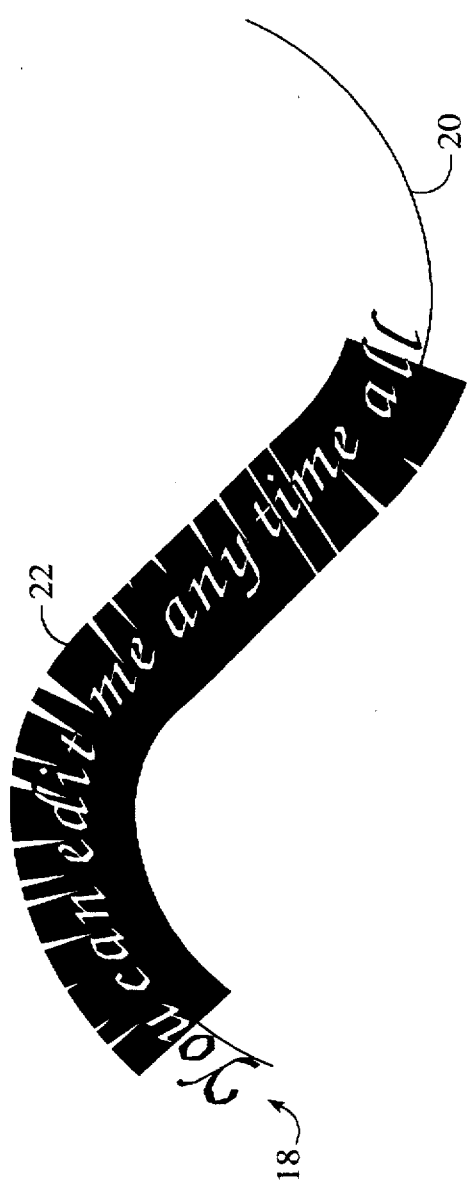
FIG. 2 is a diagram graphically illustrating typography along a geometric path that has been highlighted in accordance with conventional methods.

FIG. 2 is a diagram graphically illustrating typography 18 positioned along a geometric path 20 that has been highlighted in accordance with conventional methods. As shown, the typography 18 that the user has selected is surrounded with a field of non-continuous highlighting 22. Since the non-continuous highlighting 22 is broken around each character of the selected typography, the highlighting appears to be many small highlighting-fields strung together. Not only does the appearance of the non-continuous highlighting 22 reduce the legibility of the selected typography 18, it also aesthetically unappealing and distracting to users when attempting to edit the typography 18.

The present invention is a method and system for providing a field of continuous highlighting to typography positioned along a geometric path. The present invention will be described in terms of a software feature that is added to a graphics system, which in a preferred embodiment is the Apple QuickDraw GX Graphics System. However, one of ordinary skill in the art will recognize that the method and system is readily adaptable for other types of graphics applications. To more particularly illustrate the highlighting method and system in accordance with the present invention, refer now to FIG. 3.

Figure 3:
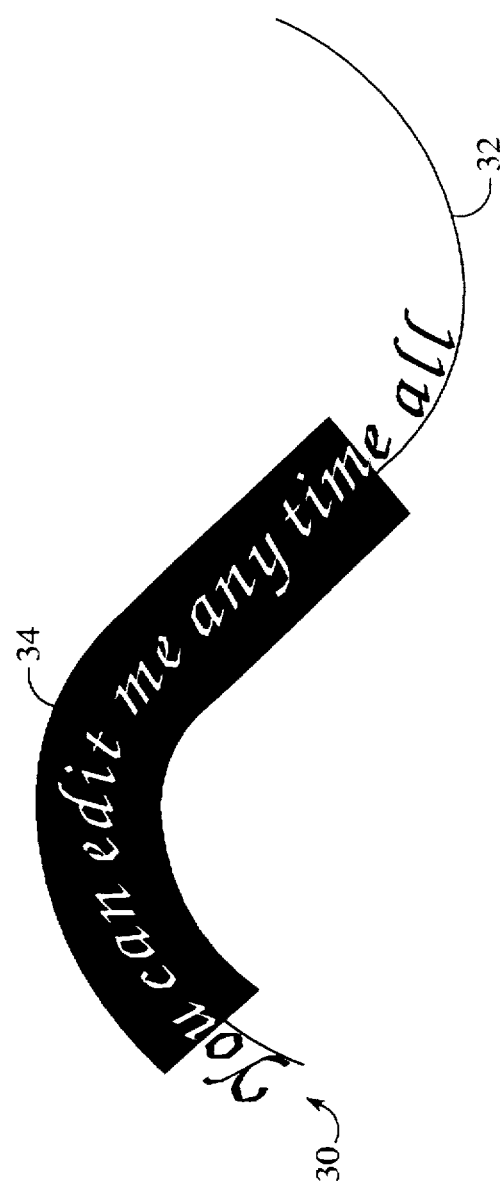
FIG. 3 is a diagram graphically illustrating typography along a geometric path that has been highlighted in accordance with the present invention.

FIG. 3 is a diagram graphically illustrating typography along a geometric path that has been blocked with a field of continuous highlighting in accordance with the present invention. As in FIG. 2, the typography 30 is shown positioned along a geometric path 32, which serves as the baseline for the typography 30. After a user has selected a portion of the typography 30 for editing, the selected typography 30 is blocked with a field of continuous highlighting 34 that bends along the shape of the geometric path 32. Providing a field of highlighting 34 that is continuous, as opposed to broken on each character, makes the selected typography 30 aesthetically more pleasing, more legible, and easier to edit.

Not only does the continuous highlighting feature of the present invention provide advantages over conventional methods, the present invention implements the continuous highlighting feature using existing graphics system functions, thereby reducing the need to write additional software. To help implement the continuous highlighting feature, the present invention utilizes a pre-existing feature of graphics systems called dashing.

The dashing feature enables a user to specify that a graphic object, such as a curve, line, or circle, be drawn with dashed contours, instead of solid contours. Input to the dashing feature is typically a reference to the object to be dashed and a description of the new dash information. The QuickDraw GX graphics system provides a user with many dash options. For example, a user may specify that the dash is either a path shape or a polygon shape, which means that a dash shape may have multiple contours. The user may also request that the dashed shape be bent to fit a curved contour exactly. For further information on the QuickDraw GX dashing feature, see *Inside Macintosh: QuickDraw GX Graphics*, by Apple Computer, Addison-Wesley Publishing Company, 1994 (Chap. 3), which is herein incorporated by reference.

The present invention uses the dashing feature to take advantage of its ability to determine the shape of the geometric path 32 on which the typography 30 has been placed. Determining the shape of the geometric path 32 is necessary to form the continuous highlight field 34 so that it follows the shape of the geometric path 32. According to the present invention, the method and system first uses the dashing feature to determine the shape of the geometric path 32 between the typography 30 selected by the user. After the shape is determined, the dashing feature is used to dash the shape with a non-repeating pattern, which in a preferred embodiment includes, but is not limited to, at least one line segment. The dashed shape is then outset from the geometric path to create an upper path, and inset from the geometric path to create a lower path. Next, the upper and lower paths are connected to create a new shape, and the new shape is filled-in to provide the field of continuous highlighting 34.

Figure 4:
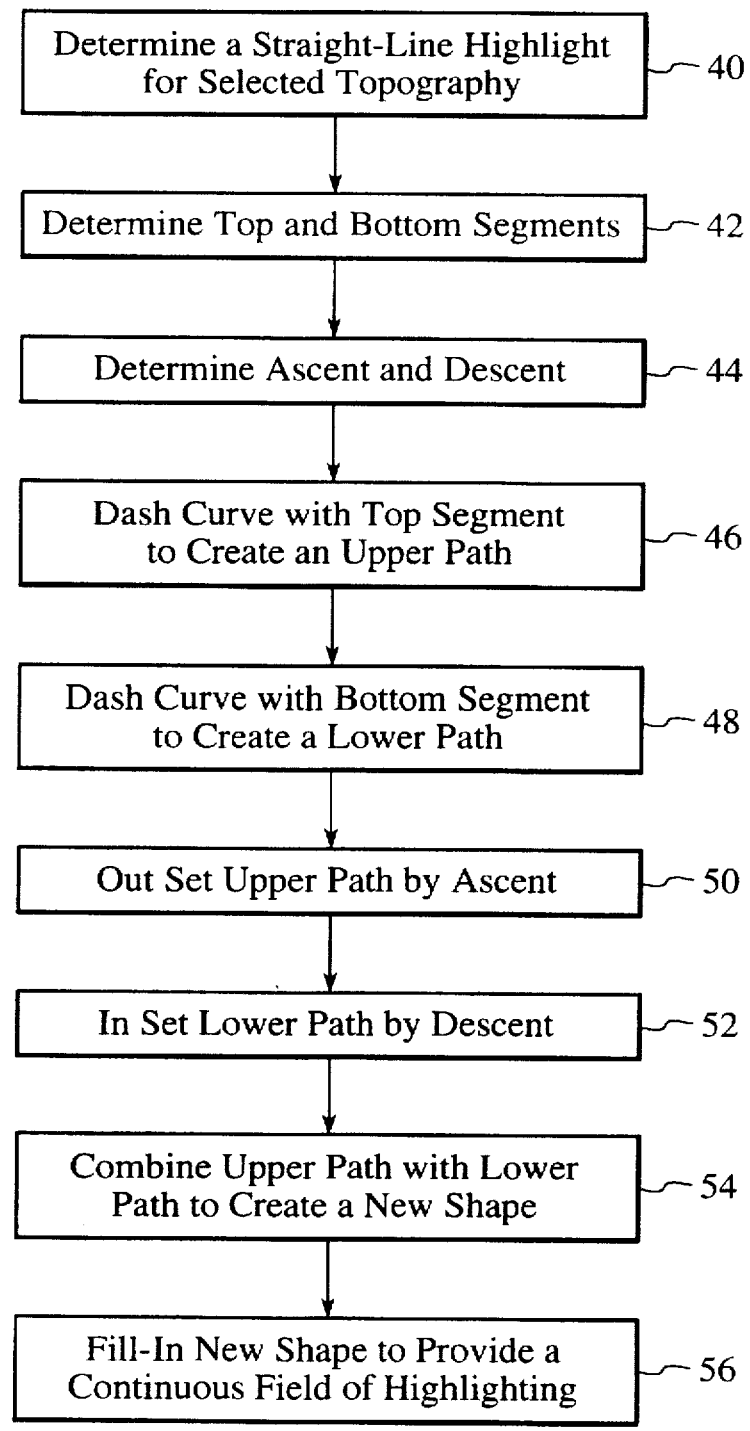
FIG. 4 is a flow chart depicting the processing steps executed by the present invention to generate continuous highlighting.

FIG. 4 is a flow chart depicting the processing steps executed by the present invention to generate continuous highlighting. Given typography 30 that the user has selected for editing, shown for example in the FIG. 3 as the characters "u can edit me any tim," a straight-line highlight for the selected text is first determined in step 40. As is well-known in the art, when a conventional graphics system is given a set of characters along a straight base-line, the system can return an object describing a four-sided shape that will highlight the characters. Therefore, in a preferred embodiment, the straight-line highlight is determined by calling this type of graphics function, referred to here as GXGetLayoutHighlight (for further information on specific functions, see the *Inside Macintosh* series of publications, such as *Inside Macintosh: QuickDraw Typography*, for example).

FIGS. 5a, 5b and 5c are diagrams graphically depicting the input to the GXGetLayoutHighlight function and the output returned. FIG. 5a shows that the input typography 30 is the twenty-two character phrase "You can edit me any time all" placed along a straight base-line. Although blank spaces in the typography are also considered characters, the spaces in FIG. 5a are shown without number indexes for simplicity.

FIG. 5b shows that given that the range of characters that the user has selected (here, characters three through nineteen), the GXGetLayoutHighlight function returns a four-sided shape, shown as straight-line highlight field 100.

Referring to FIGS. 4 and 5a–5c, from the straight-line highlight field 100, the top and bottom segments of the straight-line highlight field 100 are determined in step 42, which are shown in FIG. 5c as the top line-segment 102 and the bottom line-segment 104. Because the typography 30 is slanted due to italics, the bottom line-segment 104 extends from x-position 30 in (x,y) coordinate space, to x-position 275, while the top line-segment extends from x-position 33 to x-position 278.

After the top and bottom line-segments are determined, an ascent and a descent of the straight-line highlight 100 is determined in step 44. This is done by requesting the graphics system to return the distance that the top line-segment 102 is positioned above the base-line, which is called the ascent 106, and to return the distance that the bottom line-segment 104 is positioned below the base-line, which is called the descent 108. In a preferred embodiment, the ascent 106 and the descent 108 are determined by calling a GXGetLayoutSpan function.

Next, the dashing feature of the graphics system is utilized to calculate the shape of the geometric path 32 on which the typography 30 is positioned. The geometric path 32 is dashed between the x-coordinates defined by the top line-segment segment 102 using a non-repeating pattern comprising at least one line segment to create an upper path in step 46. The geometric path 32 is also dashed between the x-coordinates defined by the bottom line-segment 104 using a solid line to create a lower path in step 48. In a preferred embodiment, the upper and lower paths are created by calling functions GXSetShapeDash and GXPrimitiveShape.

As described above, along only the section of the geometric path 32 under the selected typography 30 is dashed with a non-repeating pattern. This is in contrast to the traditional use of the dashing feature in which an object or path is dashed by repeating a pattern of some type across the length of the entire object/path.

Figure 6A:
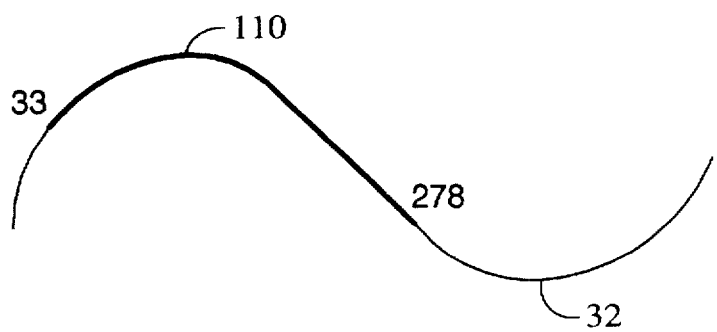
FIGS. 6a and 6b show an upper path and a lower path that follow the shape of a geometric path between the beginning and end of a selection field.
Figure 6B:
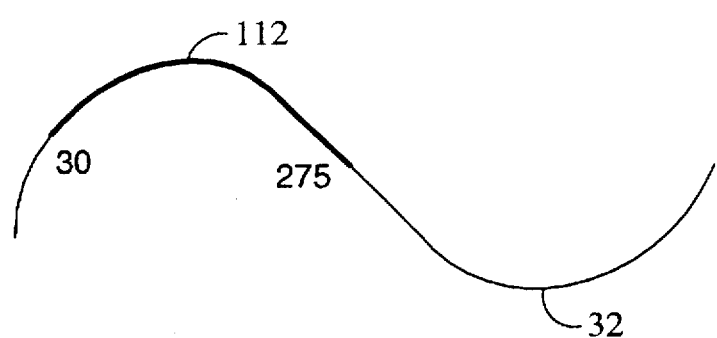

FIGS. 6a and 6b illustrate the result returned by the GXSetShapeDash and GXPrimitiveShape functions. FIG. 6a shows that given the geometric path 32 and the top line-segment 102, the functions return a new object called the upper path 110, which is a solid line following the shape of the geometric path 32 between x-position 33 and x-position 278. FIG. 6b shows that given the geometric path 32 and the bottom line-segment 104, the functions returns a new object called the lower path 112, which is a solid line following the shape of the geometric path 32 between x-position 30 and x-position 275.

Figure 7A:
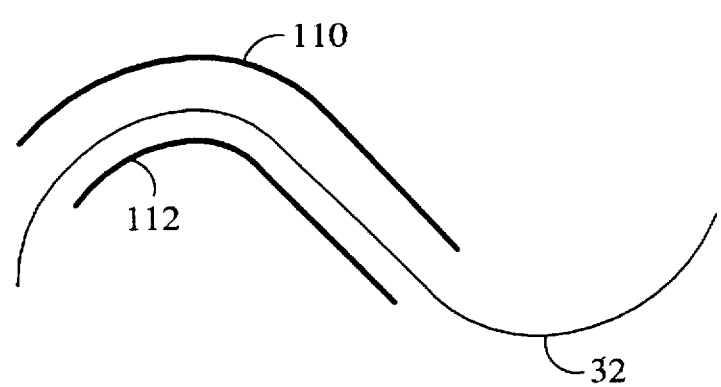
FIGS. 7a and 7b show the upper and lower paths positioned relative to a geometric path and combined into a new shape.

Referring to FIGS. 4 and 7a, after the upper path 110 is created, the upper path 110 is outset from the geometric path 32 by the ascent 106 in step 50. After the lower path 112 is created, the lower path 112 is inset from the geometric path 32 by the descent 108 in step 52. In a preferred embodiment, the positioning of the upper and lower paths 110 and 112 is accomplished by calling a GxInsetShape function, which given an object and an offset value as input, will change the position of the object by the offset.

Figure 7B:
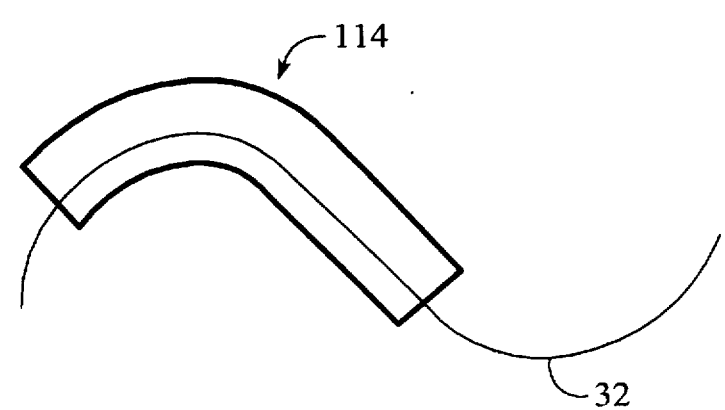

After the upper and lower paths 110 and 112 are positioned relative to the geometric path 32, the upper and lower paths 110 and 112 are combined into a new shape in step 54, as shown in FIG. 7b. The new shape 11 is then filled-in in step 56. The shape 114 is preferably filled-in by inverting pixels within the shape 14, making dark pixels light and light pixels dark. Referring again to FIG. 3, filling the new shape provides a continuous field of highlighting 34 for the selected typography 30 along the geometric path 32.

It should be understood that steps 40 through 56 are performed each time the cursor position changes so that the continuous field of highlighting 34 changes shape as the cursor is moved along the typography 30. Additionally, the present invention is intended to apply to other forms of selection, such a selection method that blocks half the height of the typography, rather than the entire height, for example. It should also be understood that the continuous highlighting method and system of the present invention will work for typography 30 formed from languages other than English.

Figure 8:
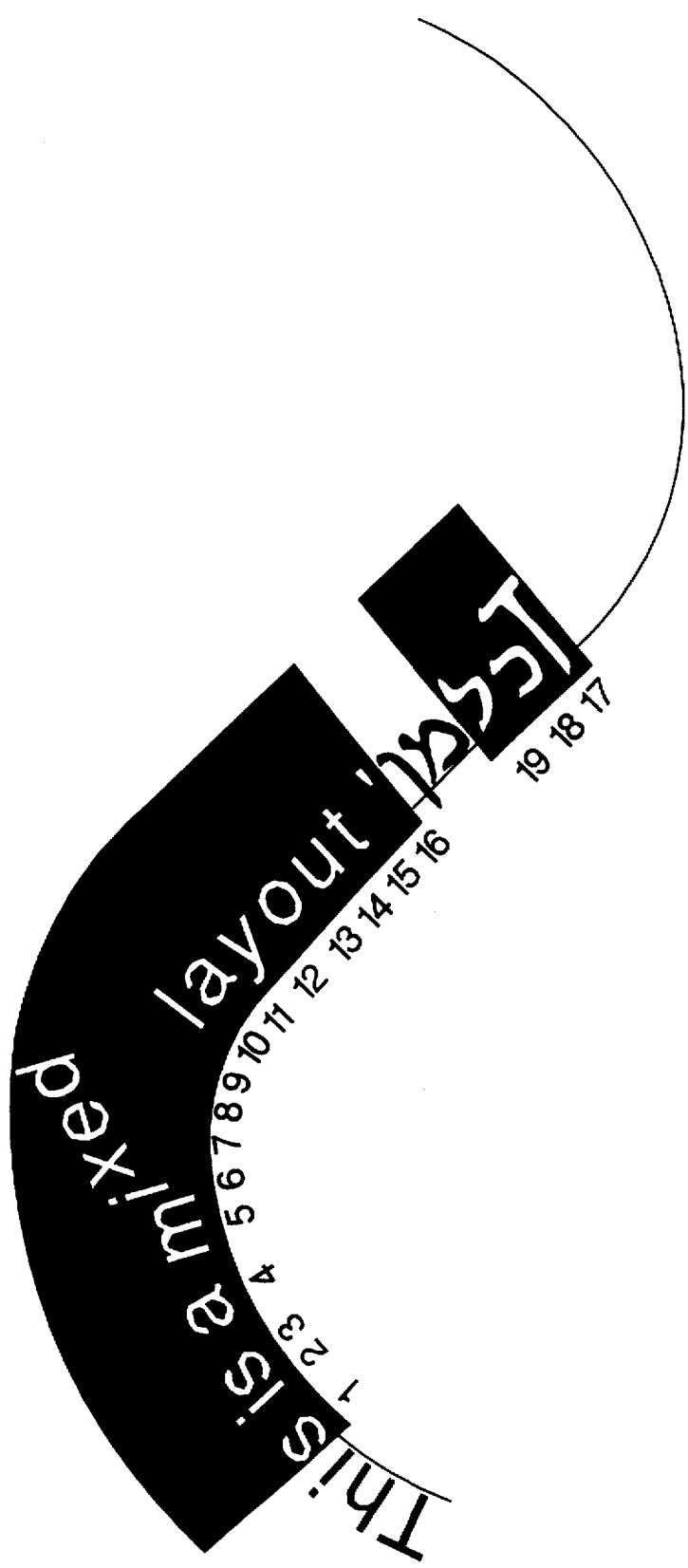
FIG. 8 is an example of typography typed along a geometric path comprising a mixture of English and Hebrew characters.

FIG. 8 is an example of typography 30 comprising a mixture of English and Hebrew characters that have been typed along a geometric path. In the example, a user has selected characters one through nineteen. Characters one through sixteen are written in English, which is written from left to right, while characters seventeen through nineteen are written in Hebrew, which is written from right to left. The example also shows characters typed well above the geometric path, which produces a significant ascent.

The mixture of the languages produces two separate highlight fields, one for the English text, and one for the Hebrew text. In the QuickDraw GX graphics system, the function GXGetLayoutHighlight is capable of returning more than one four-sided shape, and the function GXSetShapeDash is capable of accepting more than one shape as a dash. Therefore, instead of processing each field separately to provide continuous highlighting for each group of text, the two separate highlight fields may be produced simultaneously through one call to GXGetLayoutHighlight and one call to GXSetShapeDash. First, GXGetLayoutHighlight is called using all of the text as input. This returns two four-sided shapes; one for the English text, and one for the Hebrew text. Thereafter, GXSetShapeDash is called in which the non-repeating pattern for the dash is specified as the two segments corresponding to the two four-sided shapes. This produces the upper and lower paths needed to build the two continuous highlight fields, as described above.

A method and system for highlighting typography 30 along a geometric path has been disclosed that helps users edit the typography 30. And because the method and system utilizes existing graphics functions, such as dashing, the present invention eliminates the need for developers to write additional mathematical functions, which saves time, effort, and development costs. In addition, the present invention may result in graphics applications that are smaller, less complex, and less costly to maintain.

Software written according to the present invention is to be stored in some form of computer-readable medium, such as memory or CD-ROM, or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for highlighting typography along a geometric path by a graphics system that includes a dashing feature, the method comprising the steps of:

(A) using the dashing feature to determine the shape of the geometric path along a segment on which the typography is positioned;

(B) creating a field around the shape; and (C) filling-in the field to provide a continuous field of highlighting.

2. A method as in claim 1 wherein step (A) further includes the step of:

(A1) using the dashing feature to dash the segment with a non-repeating pattern.

3. A method as in claim 2 wherein step (A) further includes the step of:

(A2) outsetting and insetting the segment from the typography to create upper and lower paths.

4. A method as in claim 3 wherein step (C) further includes the step of:

(C1) connecting the upper and lower paths to create the field.

5. A method as in claim 4 wherein step (A) further includes the step of:

(A3) determining an ascent and a descent.

6. A method as in claim 5 wherein step (A) further includes the steps of:

(A4) outsetting the segment from the geometric path by the ascent to create the upper path; and (A5) insetting the segment from the geometric path by the decent to create the lower path.

7. A system for highlighting typography along a geometric path comprising:

a graphics system that includes a dashing feature;

a memory for storing the graphics system; and a processor for executing the graphics system, wherein the dashing feature is used to determine the shape of the geometric path along a segment on which the typography is positioned, the graphics system including means for creating a field around the shape and means for filling-in the field to provide a continuous field of highlighting.

8. A system as in claim 7 further including a display for displaying the typography.

9. A system as in claim 8 wherein the dashing feature is used to dash the segment with a non-repeating pattern.

10. A system as in claim 9 wherein the graphics system includes means for placing the segment above and below the typography to create upper and lower paths.

11. A system as in claim 10 wherein the graphics system further includes means for connecting the upper and lower paths to create the field.

12. A system as in claim 11 wherein the graphics system further includes means for determining an ascent and a descent;

means for outsetting the segment from the geometric path by the ascent to create the upper path; and means for insetting the segment from the geometric path by the decent to create the lower path.

13. A system as in claim 12 wherein the graphics system is QuickDraw GX.

14. A method for highlighting typography along a geometric path by a graphics system that includes a dashing feature, the method comprising the steps of:

(A) using the dashing feature to determine the shape of the geometric path along a segment on which the typography is positioned;

(B) using the dashing feature to dash the segment with a non-repeating pattern comprising at least one line;

(C) placing the segment above and below the typography to create upper and lower paths;

(D) connecting the upper and lower paths to create a new shape; and (E) filling-in the new shape to provide a field of continuous highlighting.

15. A method as in claim 14 wherein step (C) further includes the step of:

(C1) determining an ascent and a descent.

16. A method as in claim 15 wherein step (C) further includes the step of:

(C2) outsetting the segment from the geometric path by the ascent to create the upper path.

17. A method as in claim 16 wherein step (C) further includes the step of:

(C3) insetting the segment from the geometric path by the decent to create the lower path.

18. A method for highlighting typography along a geometric path, wherein selected typography is indicated by a selection field, the selection field having a beginning and an end, the method comprising the steps of:

(A) determining an ascent and a descent of the selection field;

(B) dashing the geometric path between the beginning and end of the selection field with a non-repeating pattern to create a dashed segment;

(C) outsetting the dashed segment from the selected typography according to the ascent to create an upper path;

(D) insetting the dashed segment from the selected typography according to the decent to create a lower path;

(E) creating a shape bounded by the upper and lower paths; and (F) filling in the shape to provide a continuous field of highlighting.

19. A method for highlighting typography along a geometric path using a graphics system, the typography positioned along (x,y) coordinates of the geometric path, the method comprising the steps of:

(A) determining a four-sided shape that will highlight the typography along a straight line;

(B) determining a top segment and a bottom segment that extends the length of the four-sided shape;

(C) dashing the geometric path along the x-coordinates corresponding to the x-coordinates of the top line-segment to create an upper path;

(D) dashing the geometric path along the x-coordinates corresponding to the x-coordinates of the bottom line-segment to create a lower path;

(E) determining the ascent of the top segment and the descent of the bottom segment;

(F) outsetting the upper path from the geometric path by the ascent;

(G) insetting the lower path from the geometric path by the descent;

(H) combining the upper and lower paths to creating a new shape; and (I) filling-in the new shape such that a field of continuous highlighting is provided.

20. A method as in claim 19 wherein step (C) further includes the step of:

(C1) dashing the geometric path with a non-repeating pattern comprising at least one line.

21. A method as in claim 20 wherein step (D) further includes the step of:

(D1) dashing the geometric path with a non-repeating pattern comprising at least one line.

22. A computer-readable medium containing program instructions for highlighting typography along a geometric path by a graphics system that includes a dashing feature, the program instructions for:

(A) instructing the dashing feature to determine the shape of the geometric path along a segment on which the typography is positioned;

(B) instructing the dashing feature to dash the segment with a non-repeating pattern;

(C) placing the segment above and below the typography to create upper and lower paths;

(D) connecting the upper and lower paths to create a new shape; and (E) filling-in the new shape to provide a field of continuous highlighting.

23. A computer-readable medium as in claim 22 wherein instruction (C) further includes an instruction for:

(C1) determining an ascent and a descent.

24. A computer-readable medium as in claim 23 wherein instruction (C) further an instruction for:

(C2) outsetting the segment from the geometric path by the ascent to create the upper path.

25. A computer-readable medium as in claim 24 wherein instruction (C) further includes an instruction for:

(C3) insetting the segment from the geometric path by the decent to create the lower path.

* * * * *